F. W. ROSENGREN.
BURNER.
APPLICATION FILED SEPT. 15, 1911.

1,073,711.  Patented Sept. 23, 1913.

Witnesses:
John Enders
Mildred Stumpf

Inventor.
Frank W. Rosengren
By F. A. Gerlach
Atty.

UNITED STATES PATENT OFFICE.

FRANK W. ROSENGREN, OF CHICAGO, ILLINOIS, ASSIGNOR TO ENTERPRISE TOOL AND METAL WORKS, OF CHICAGO, ILLINOIS, A CORPORATION OF ILLINOIS.

BURNER.

1,073,711.

Specification of Letters Patent.

Patented Sept. 23, 1913.

Application filed September 15, 1911. Serial No. 649,479.

*To all whom it may concern:*

Be it known that I, FRANK W. ROSENGREN, a citizen of the United States, resident of Chicago, in the county of Cook and State of Illinois, have invented certain new and useful Improvements in Burners, of which the following is a full, clear, and exact description.

The invention relates to vapor-burners, and more particularly to the screen or divider usually employed at the outlet end of the burner-pipe, and through which the vapor passes before being ignited in proximity to the usual mantle.
Heretofore it has been common practice to provide a screen formed of gauze or a flexible corrugated strip, for mixing the constituents of, and distributing the gas or vapor in transit to the point of consumption, and it has been found that the proximity of the flame to the screen, causes the latter to become affected by the heat, so that occasional replacement is necessary, and that such screens, in time, become disintegrated from use.

One object of the invention is to provide an improved screen, or divider which may be formed of solid metal and by which the constituents of the vapor will be thoroughly commingled, or the gas or the vapor will be evenly distributed in passing therethrough. By forming the screen out of a solid piece or block of metal, the parts thereof may be made of such thickness and strength that they will not be disintegrated by heat and the screen may be so formed that the gas or vapor may be caused to pass indirectly therethrough to effect more thorough mixture of the constituents and distribution of the gas or vapor.

The invention consists in the novel feature hereinafter set forth and more particularly defined by claims at the conclusion hereof.

Figure 3:
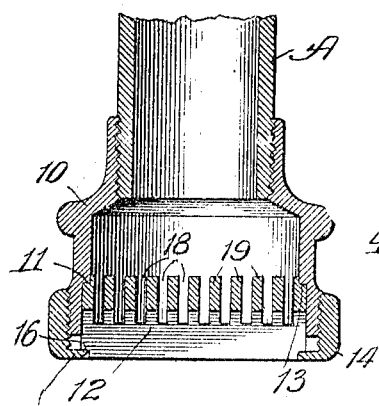
Figure 2:
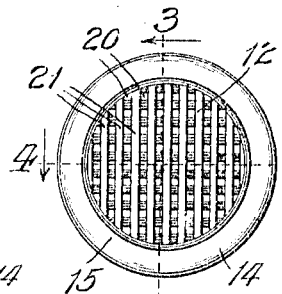
Figure 4:
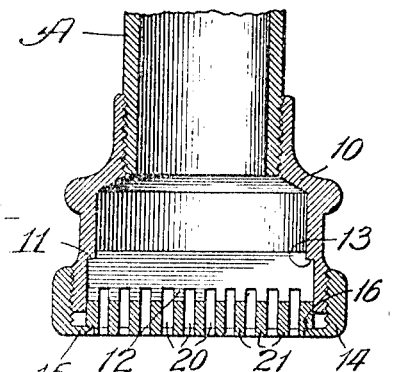
Figure 5:
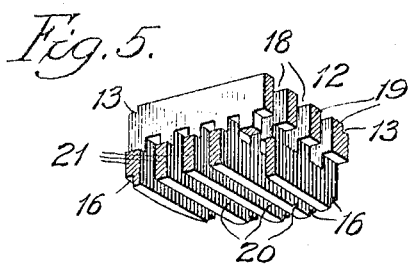
Figure 6:
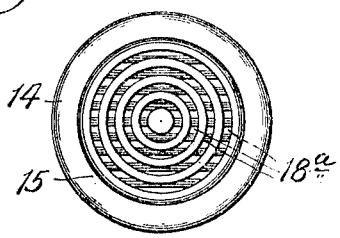
Figure 1:
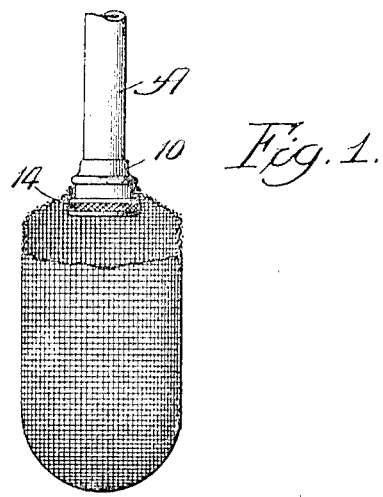

In the drawings: Figure 1 is a side elevation of a burner embodying the invention a portion of the mantle being broken away. Fig. 2 is an inverted plan of the improved screen in the burner-pipe. Fig. 3 is a section taken on line 3—3 of Fig. 2. Fig. 4 is a section taken on line 4—4 of Fig. 2. Fig. 5 is a sectional perspective of the screen. Fig. 6 is a plan of a modified form of the invention.

A denotes a burner-tube which may be connected in the usual and suitable manner to a supply of gas or vapor, as well understood in the art. A hollow enlarged head 10 is screw-threaded to the end of pipe A. A shoulder 11 is formed in said head, to provide a seat for the screen 12. the latter being provided with shoulders 13 adapted to rest upon shoulder 11. A collar 14 is screw-threaded to the lower end of head 10 and has an inwardly extending flange 15 which is adapted to engage shoulders 16 formed on the screen, to clamp the screen against shoulder 11 and removably secure it to the head.

The screen is formed of a single piece or block of metal, such as brass, and its upper portion is formed with a series of parallel grooves 18 extending entirely across the upper face of the screen, leaving ribs or bars 19 therebetween. The lower face of the screen is formed with a series of parallel grooves 20 extending transversely or at right angles, to the grooves 18, leaving a series of ribs or bars 21 therebetween, which extend at right angles or transversely to the ribs 19. Grooves 18 and 20 are of such depth that they overlap or intersect each other and resultantly, the vapor will not necessarily pass directly through the screen, but will pass between the ribs or bars 19, and portions of the vapor will encounter the lower edges of the ribs 21 which will act as baffles and serve to effect a more thorough commingling of the constituents and distribution of the vapor. This screen may be produced at a low cost, by grooving a solid piece or block of metal with parallel grooves, in one direction by means of a series of tools and then grooving the other face thereof in transverse direction thereto. The improved screen will be durable by reason of its integral construction, as compared with one made of fine soft wire or a bent strip, and will be rigid throughout. Furthermore, by reason of the relatively transverse disposition of the upper and lower bars and grooves and by providing cross communication between the lower grooves and upper grooves, the screen serves to efficiently divide and distribute the vapor into a series of small jets and canals, the constituents of the vapor to commingle with each other so that the vapor will burn evenly, and so that the flame will not cause excessive heat at any one part of the mantle.

The device shown is formed so that the grooves therein may be cut or wrought as distinguished from being cast with the grooves or openings therein. In practice, there is a marked difference between the operation of a screen formed of cast metal and one of wrought metal, because the cast metal disintegrates quicker than wrought metal, and furthermore, the surface and edges of the cast metal are not sharp and clean and, therefore, the burner is rendered noisy, on the other hand, when the screen is formed of wrought metal with clean or cut edges and plain surfaces, this objection is not present.

The invention thus provides a screen which can be produced at a low cost and which is rigid and durable and effectively causes the commingling of the constituents and distribution of the vapor.

In Fig. 6 a modification of the invention is illustrated, in which the series of grooves 18ª in one face are circular in form, as distinguished from straight.

The invention is not to be restricted to the details set forth since these may be modified by the skilled mechanic, within the scope of the appended claims, without departing from the spirit and scope of the invention.

Having thus described the invention what I claim as new and desire to secure by Letters Patent is,

1. The combination with a burner of a screen formed of a block of metal having a series of continuous grooves cut in each of two of its opposite faces, the grooves being cut to leave ribs or bars on each of said faces, the grooves in one face communicating with and being cut transversely to those in the other face, the bars or ribs on one face being transverse to those on the other.

2. The combination with a burner of a screen formed of a block of metal having a series of continuous grooves cut in each of two of its opposite faces, the grooves being cut to leave ribs or bars on each of said faces, the grooves in one face being cut of sufficient depth to intersect and extend beyond those in the other face and crosswise thereof, the bars or ribs on one face being transverse of those on the other.

3. The combination with a burner of a screen formed of a block of metal and having a plurality of series of straight grooves cut therein leaving ribs or bars between the grooves, the ribs or bars of one series extending transversely to the bars and grooves of the other series.

FRANK W. ROSENGREN.

Witnesses:
FRED GERLACH,
MILDRED STUMPF.